US009972885B2

(12) United States Patent
Wu et al.

(10) Patent No.: US 9,972,885 B2
(45) Date of Patent: May 15, 2018

(54) LONG-DISTANCE RADIO FREQUENCY ELECTRONIC IDENTIFICATION TIRE STRUCTURE

(71) Applicants: Chi Ju Wu, Taoyuan (TW); Shirl Mei Chang, Taoyuan (TW); Alexander Chan, Taoyuan (TW); Chin Hsien Ting, Taoyuan (TW); Hsi Jui Chan, Taoyuan (TW)

(72) Inventors: Chi Ju Wu, Taoyuan (TW); Shirl Mei Chang, Taoyuan (TW); Alexander Chan, Taoyuan (TW); Chin Hsien Ting, Taoyuan (TW); Hsi Jui Chan, Taoyuan (TW)

(73) Assignee: Read Tag Technology Corp., Taoyuan (TW)

( * ) Notice: Subject to any disclaimer, the term of this patent is extended or adjusted under 35 U.S.C. 154(b) by 0 days. days.

(21) Appl. No.: 15/665,424

(22) Filed: Aug. 1, 2017

(65) Prior Publication Data
US 2017/0358839 A1    Dec. 14, 2017

(30) Foreign Application Priority Data
Aug. 18, 2016   (TW) .............................. 105126302 A

(51) Int. Cl.
| H01Q 1/40 | (2006.01) |
| H01Q 1/32 | (2006.01) |
| B60C 19/00 | (2006.01) |
| H01Q 1/22 | (2006.01) |
| H01Q 7/00 | (2006.01) |
| G06K 19/077 | (2006.01) |
| B60C 23/04 | (2006.01) |

(52) U.S. Cl.
CPC ........... *H01Q 1/2241* (2013.01); *B60C 23/04* (2013.01); *G06K 19/07764* (2013.01); *G06K 19/07773* (2013.01); *H01Q 1/3291* (2013.01); *H01Q 7/00* (2013.01)

(58) Field of Classification Search
CPC ............. H01Q 1/40; H01Q 1/32; B60C 19/00
USPC ................ 235/492; 343/711, 873; 152/152.1
See application file for complete search history.

(56) References Cited

U.S. PATENT DOCUMENTS 5,348,067 A * 9/1994 Myatt ................. B60C 23/0467
                                                                152/152.1
6,147,659 A * 11/2000 Takahashi ............. B60C 9/2006
                                                                340/572.1

(Continued)

*Primary Examiner* — Daniel Hess

(57) ABSTRACT

A long-distance radio frequency electronic identification tire structure is provided. When the production of the tire is completed and an electronic tag reading device is used for identification, an RFID chip of an ultra high frequency electronic tag of a main tire body receives and sends an electromagnetic wave signal generated by a far-field copper film antenna and the electronic tag reading device. The frequency band and the bandwidth of the electromagnetic wave signal are adjusted by a frequency band/bandwidth adjustment portion, and first and second field effect adjustment grooves of first and second field effect adjustment portions are configured to adjust the field effect when a tire bead bundle and a steel belt layer reflect the electromagnetic wave signal, so that the electronic tag reading device can read the identification code of the ultra high frequency electronic tag at a wide angle and a long distance.

6 Claims, 5 Drawing Sheets

(56) References Cited

U.S. PATENT DOCUMENTS

| | | | | |
|---|---|---|---|---|
| 6,474,380 B1* | 11/2002 | Rensel | ................ | B60C 23/0433 |
| | | | | 152/152.1 |
| 2003/0156067 A1* | 8/2003 | Tenten | ................ | B60C 23/0433 |
| | | | | 343/711 |
| 2005/0093761 A1* | 5/2005 | King | ................ | G06K 19/07749 |
| | | | | 343/873 |
| 2008/0156406 A1* | 7/2008 | Breed | ................... | B60C 23/041 |
| | | | | 152/415 |

* cited by examiner

LONG-DISTANCE RADIO FREQUENCY ELECTRONIC IDENTIFICATION TIRE STRUCTURE

FIELD OF THE INVENTION

The present invention relates to a long-distance radio frequency electronic identification tire structure which can use an identification code as an accurate identification of an individual tire during the transportation, detection, and storage of tires after manufactured, thereby improving the management and identification of tires.

BACKGROUND OF THE INVENTION

The process for manufacturing a tire includes mixing rubber materials, calendaring the mixed rubber materials, overmolding the raw tire, and curing the raw tire to complete the final shape of the tire, including a tread pattern and a sidewall mark. After the completion of the tire production, based on the security of use, the tire must be transported or sent to the laboratory for a strict testing, and then the qualified tires are stored in the warehouse. The products are allocated with serial numbers for shipment. During the process from detection to shipment, a tag is manually attached to each of the products. This way consumes labor and is easy to make a mistake. Conventional one-dimensional or two-dimensional bar code label identification uses an optical scanner to perform an electronic identification to reduce the errors. However, for the manpower or mechanical automated scanning, there is a scanning distance or angle limit. Sometimes, it is unable to complete the identification. Accordingly, the inventor of the present invention has devoted himself based on his many years of practical experiences to solve these problems.

SUMMARY OF THE INVENTION

The primary object of the present invention is to provide a long-distance radio frequency electronic identification tire structure, comprising a main tire body with an ultra high frequency electronic tag (UHF TAG). An outer surface of the main tire body is formed with a tire tread. Each of two sides of the tire tread is formed with a tire shoulder and a tire sidewall. The main tire body has a bead assembly composed of a tire bead bundle and a bead filler, and includes an airtight layer, a liner layer, a steel belt layer, and a cover layer arranged from inside to outside. The ultra high frequency electronic tag comprises a substrate sheet made of a flexible temperature-resistant insulating material, a far-field copper film antenna formed on a surface of the substrate sheet, and an antenna protective film made of a flexible temperature-resistant insulating material attached to a surface of the far-field copper film antenna. The far-field copper film antenna includes a frequency band/bandwidth adjustment portion, a first field effect adjustment portion and a second field effect adjustment portion at two sides of the frequency band/bandwidth adjustment portion, respectively. The frequency band/bandwidth adjustment portion has a rectangular perforation formed on a copper film to form a rectangular loop circuit. The rectangular loop circuit is electrically connected with a radio frequency identification (RFID) chip. The first field effect adjustment portion is a square wave antenna electrically connected with the rectangular loop circuit and matched with the tire bead bundle and the steel belt layer of the main tire body, and has a plurality of first field effect adjustment grooves. The second field effect adjustment portion is a square wave antenna electrically connected with the rectangular loop circuit and matched with the tire bead bundle and the steel belt layer of the main tire body, and has a plurality of second field effect adjustment grooves each having a width less than that of the first field effect adjustment grooves. When the production of the tire is completed, an electronic tag reading device is used for identification. The RFID chip of the ultra high frequency electronic tag of the main tire body receives and sends the electromagnetic wave signal generated by the far-field copper film antenna and the electronic tag reading device. The frequency band and the bandwidth of the electromagnetic wave signal are adjusted by the frequency band/bandwidth adjustment portion, and the first and second field effect adjustment grooves of the first and second field effect adjustment portions are configured to adjust the field effect when the tire bead bundle and the steel belt layer reflect the electromagnetic wave signal, so that the electronic tag reading device can read the identification code of the ultra high frequency electronic tag of the main tire body at a wide angle and a long distance. During the transportation, detection, and storage of tires after manufactured, the ID code can be used as an accurate identification of an individual tire, thereby improving the management and identification of tires.

Preferably, the ultra high frequency electronic tag is attached to the surface of the liner layer of the main tire body and covered by the tire sidewall at one side of the tire tread. The ultra high frequency electronic tag is hidden and secured between the liner layer and the tire sidewall, so that the ultra high frequency electronic tag is disposed inside the tire to prevent it from falling. The substrate sheet 21 of the ultra high frequency electronic tag is provided with a near-field loop antenna formed by etching a copper foil at one side of the far-field copper film antenna. Two ends of the near-field loop antenna are electrically connected with a radio frequency identification (RFID) chip to form a high frequency electronic tag (HF TAG). A high frequency electronic tag reading device can be used and placed near the outer surface of the tire sidewall to read the identification code of the radio frequency identification chip as the tire identification, thereby facilitating the management for tire sales. A high frequency electronic tag (HF TAG) is attached to a side of the ultra high frequency electronic tag. The high frequency electronic tag has a near-field loop antenna matched with the far-field copper film antenna of the ultra high frequency electronic tag. Two ends of the near-field loop antenna are electrically connected with a radio frequency identification (RFID) chip. A high frequency electronic tag reading device can be used and placed near the outer surface of the tire sidewall to read the identification code of the radio frequency identification chip as the tire identification, thereby facilitating the management for tire sales.

Preferably, the frequency band/bandwidth adjustment portion of the far-field copper film antenna of the ultra high frequency electronic tag uses the rectangular perforation to adjust the frequency band and bandwidth for use. The first field effect adjustment portion and the second field effect adjustment portion are dual square wave antennas and are asymmetrical according to the reflection field pattern of the tire bead bundle and the steel belt layer relative to the electromagnetic wave signal. The first field effect adjustment portion is formed with two first field effect adjustment grooves. The second field effect adjustment portion is formed with two second field effect adjustment grooves. The first field effect adjustment grooves each have a width greater than that of the second field effect adjustment grooves. The first field effect adjustment portion and the second field effect adjustment portion match with the field pattern when the tire bead bundle and the steel belt layer reflect the electromagnetic wave signal. The frequency band/bandwidth adjustment portion uses the rectangular perforation to adjust the frequency band and bandwidth for the electromagnetic wave signal, such that the ultra high frequency electronic tag of the tire main body can be read at a large angle and a long distance in the frequency band to be used.

Preferably, the substrate sheet and the antenna protective film of the ultra high frequency electronic tag are flexible temperature-resistant insulating films made of a polyimide (PI) material. Through the temperature-resistant characteristics of the polyimide material, the ultra high frequency electronic tag in the main tire body is capable of withstanding the operating temperature during the raw tire production process and the vulcanization process without being damaged or deformed.

DETAILED DESCRIPTION OF THE PREFERRED EMBODIMENTS

Embodiments of the present invention will now be described, by way of example only, with reference to the accompanying drawings.

Figure 5:
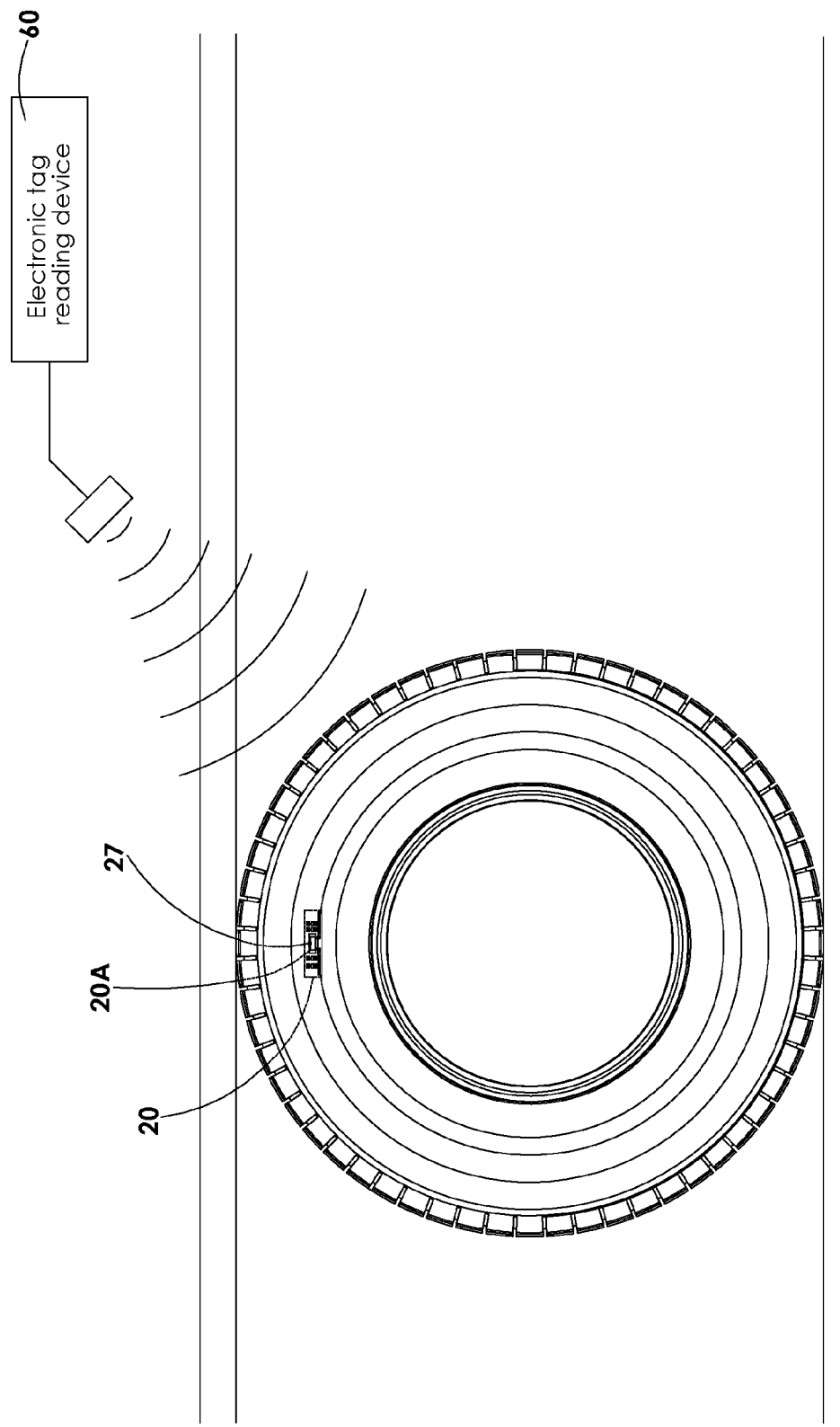
FIG. 5 is a schematic view showing the reading of the electronic tag reading device of the present invention.

A long-distance radio frequency electronic identification tire structure, as shown in FIG. 1, FIG. 2, FIG. 3, and FIG. 4, comprises a main tire body 10 with an ultra high frequency electronic tag (UHF TAG) 20. An outer surface of the main tire body 10 is formed with a tire tread 30. Each of two sides of the tire tread 30 is formed with a tire shoulder 40 and a tire sidewall 50. The main tire body 10 has a bead assembly composed of a tire bead bundle 11 and a bead filler 12, and includes an airtight layer 13, a liner layer 14, a steel belt layer 15, and a cover layer 16 arranged from inside to outside. The ultra high frequency electronic tag 20 comprises a substrate sheet 21 made of a flexible temperature-resistant insulating material, a far-field copper film antenna 20A formed by etching a copper foil on a surface of the substrate sheet 21, and an antenna protective film 22 made of a flexible temperature-resistant insulating material attached to a surface of the far-field copper film antenna 20A. The far-field copper film antenna 20A includes a frequency band/bandwidth adjustment portion 24, a first field effect adjustment portion 25 and a second field effect adjustment portion 26 at two sides of the frequency band/bandwidth adjustment portion 24, respectively. The frequency band/bandwidth adjustment portion 24 has a rectangular perforation 240 formed on a copper film to form a rectangular loop circuit 241. One end of the rectangular loop circuit 241 is electrically connected with a radio frequency identification (RFID) chip 27. The first field effect adjustment portion 25 is a square wave antenna electrically connected with the rectangular loop circuit 241 and matched with the tire bead bundle 11 and the steel belt layer 15 of the main tire body 10, and has a plurality of first field effect adjustment grooves 250. The second field effect adjustment portion 26 is a square wave antenna electrically connected with the rectangular loop circuit 241 and matched with the tire bead bundle 11 and the steel belt layer 15 of the main tire body 10, and has a plurality of second field effect adjustment grooves 260 each having a width less than that of the first field effect adjustment grooves 250. As shown in FIG. 5, when the production of the tire is completed, an electronic tag reading device 60 is used for identification. As shown in FIG. 2 to FIG. 5, the RFID chip 27 of the ultra high frequency electronic tag 20 of the main tire body 10 receives and sends the electromagnetic wave signal generated by the far-field copper film antenna 20A and the electronic tag reading device 60. The frequency band and the bandwidth of the electromagnetic wave signal are adjusted by the frequency band/bandwidth adjustment portion 24, and the first and second field effect adjustment grooves 250, 260 of the first and second field effect adjustment portions 25, 26 are configured to adjust the field effect when the tire bead bundle 11 and the steel belt layer 15 reflect the electromagnetic wave signal, so that the electronic tag reading device 60 can read the identification code of the ultra high frequency electronic tag 20 of the main tire body 10 at a wide angle (a large reading angle) and a long distance. During the transportation, detection, and storage of tires after manufactured, the ID code can be used as an accurate identification of an individual tire, thereby improving the management and identification of tires.

Figure 1:
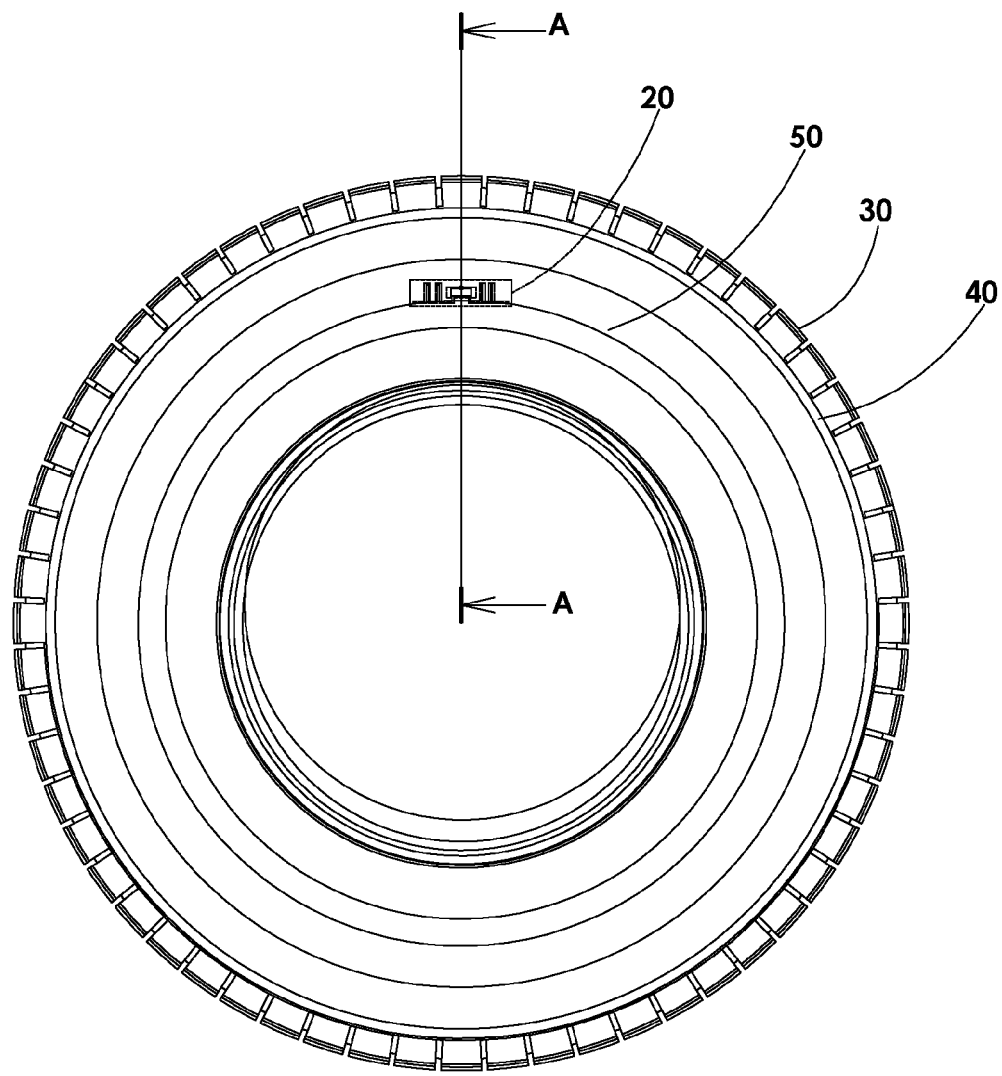
FIG. 1 is a plan view of the present invention.
Figure 2:
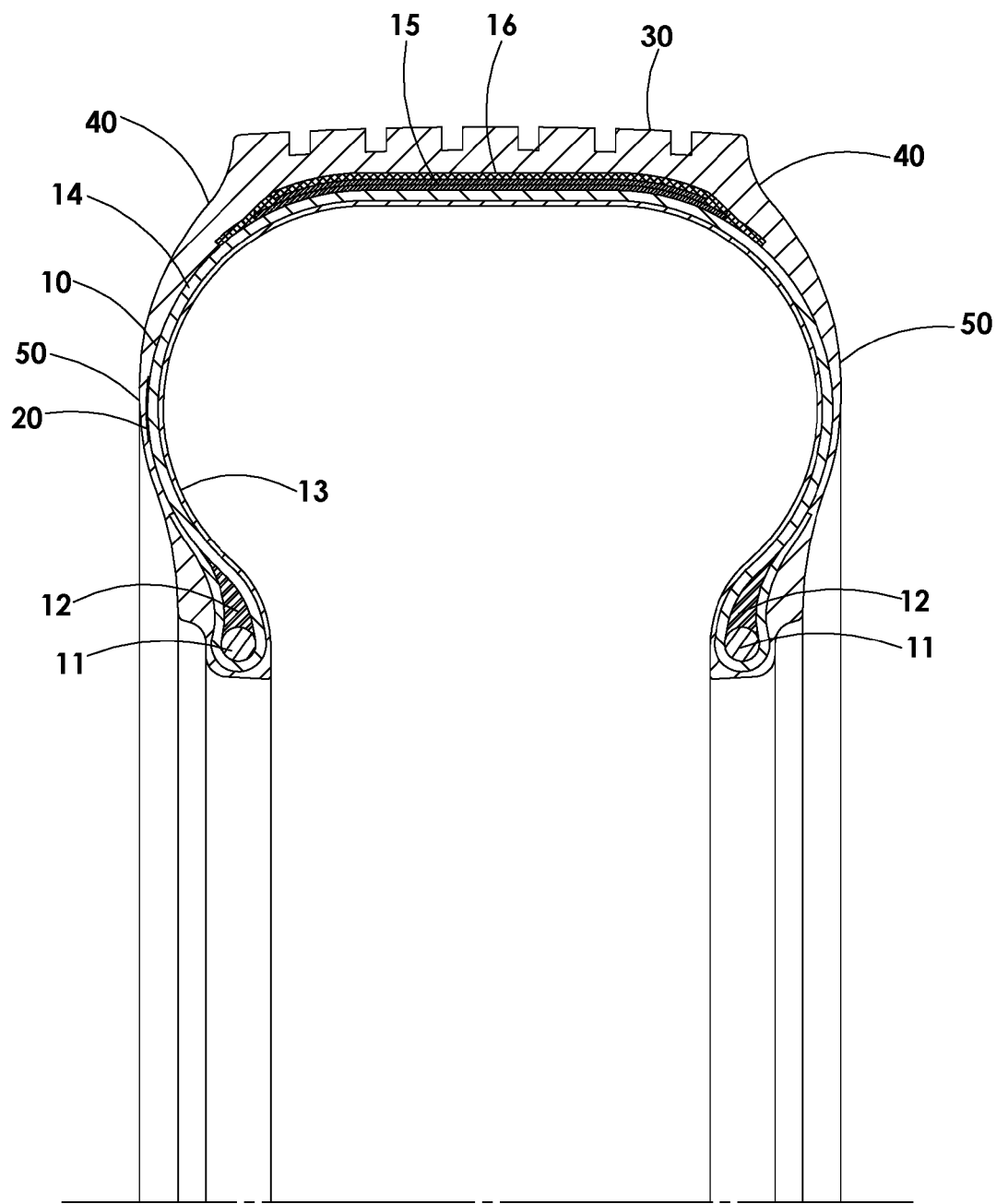
FIG. 2 is a sectional view taken along line A-A of FIG. 1.
Figure 6:
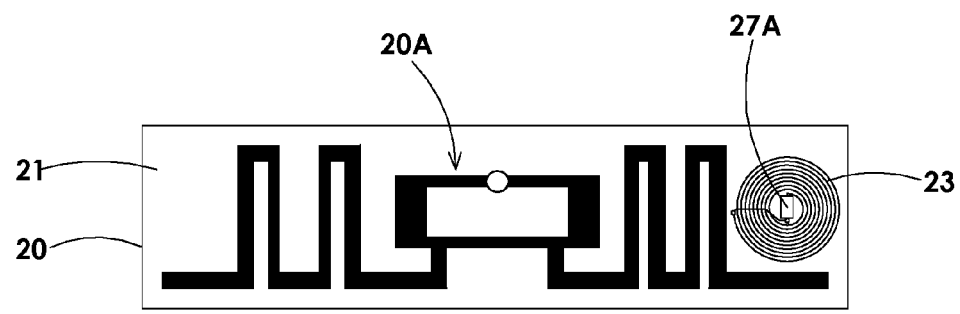
FIG. 6 is a schematic view of the ultra high frequency electronic tag provided with the high frequency electronic tag of the present invention.
Figure 7:
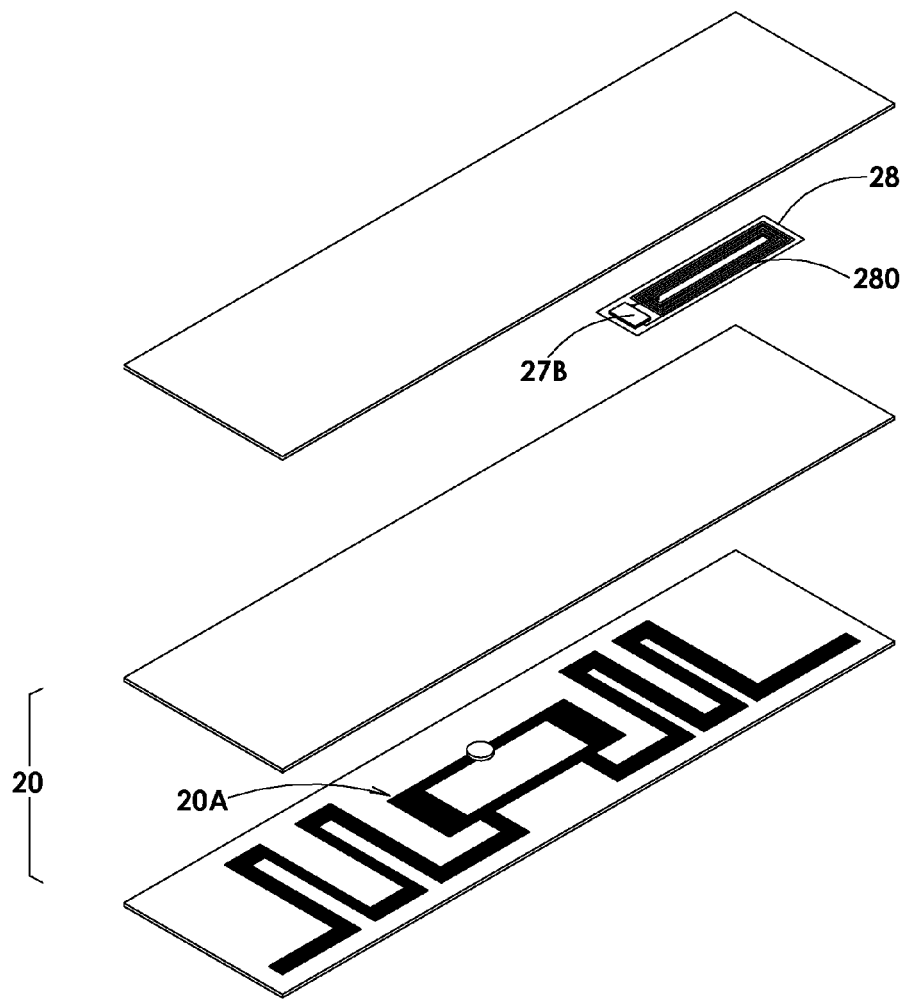
FIG. 7 is an exploded view of the high frequency electronic tag added on the ultra high frequency electronic tag of the present invention.

According to the aforesaid embodiment, as shown in FIG. 1 and FIG. 2, the ultra high frequency electronic tag 20 is attached to the surface of the liner layer 14 of the main tire body 10 and covered by the tire sidewall 50 at one side of the tire tread 30. The ultra high frequency electronic tag 20 is hidden and secured between the liner layer 14 and the tire sidewall 50, so that the ultra high frequency electronic tag 20 is disposed inside the tire to prevent it from falling. As shown in FIG. 2 and FIG. 6, the substrate sheet 21 of the ultra high frequency electronic tag 20 is provided with a near-field loop antenna 23 formed by etching the copper foil at one side of the far-field copper film antenna 20A. Two ends of the near-field loop antenna 23 are electrically connected with a radio frequency identification (RFID) chip 27A to form a high frequency electronic tag (HF TAG). A high frequency electronic tag reading device (not shown) can be used and placed near the outer surface of the tire sidewall 50 to read the identification code of the radio frequency identification chip 27A as the tire identification, thereby facilitating the management for tire sales. As shown in FIG. 2 and FIG. 7, a high frequency electronic tag (HF TAG) 28 is attached to a side of the ultra high frequency electronic tag 20. The high frequency electronic tag 28 has a near-field loop antenna 280 matched with the far-field copper film antenna 20A of the ultra high frequency electronic tag 20. Two ends of the near-field loop antenna 280 are electrically connected with a radio frequency identification (RFID) chip 27B. A high frequency electronic tag reading device (not shown) can be used and placed near the outer surface of the tire sidewall 50 to read the identification code of the radio frequency identification chip 27B as the tire identification, thereby facilitating the management for tire sales.

According to the aforesaid embodiment, as shown in FIG. 1 to FIG. 4, the frequency band/bandwidth adjustment portion 24 of the far-field copper film antenna 20A of the UHF electronic tag 20 uses the size of the rectangular perforation 240 to adjust the frequency band and bandwidth for use. The first field effect adjustment portion 25 and the second field effect adjustment portion 26 are dual square wave antennas and are asymmetrical according to the reflection field pattern of the tire bead bundle 11 and the steel belt layer 15 relative to the electromagnetic wave signal. The first field effect adjustment portion 25 is formed with two first field effect adjustment grooves 250. The second field effect adjustment portion 26 is formed with two second field effect adjustment grooves 260. The first field effect adjustment grooves 250 each have a width greater than that of the second field effect adjustment grooves 260. The first field effect adjustment portion 25 and the second field effect adjustment portion 26 match with the field pattern when the tire bead bundle 11 and the steel belt layer 15 reflect the electromagnetic wave signal. The frequency band/bandwidth adjustment portion 24 uses the rectangular perforation 240 to adjust the frequency band and bandwidth for the electromagnetic wave signal, such that the ultra high frequency electronic tag 20 of the tire main body 10 can be read at a large angle and a long distance in the frequency band to be used. That is, most countries or regions will regulate the frequency band for the use of the electronic tags (RFID TAG). For example, in Taiwan, the frequency band is in the range of 920-930 $MH_Z$. Through the size of the rectangular perforation 240, the width of the first and second field effect adjustment grooves 250, 260 are adjusted according to the field pattern of the tire bead bundle 11 and the steel belt layer 15 relative to the electromagnetic wave signal. The ultra high frequency electronic tag 20 is disposed in the main tire body 10. The ultra high frequency electronic tag 20 is tested in the frequency band of 800 $MH_Z$-1000 $MH_Z$ by the Finnish Voyntic Tagformance Lite Measurement System (UHF RFID), as shown in the test report of Annex I. The test report confirms that the effective reading distance of the ultra high frequency electronic tag 20 in the main tire body 10 can be maintained at least 4.6-4.7 meters by using a general commercial reader (AWID & IMPINJI). As to the effective reading distance of 4.6~4.7 meters, in the work environment of the tire production process, it is enough to meet the requirements of a reading distance for the installation of a reader.

Figure 3:
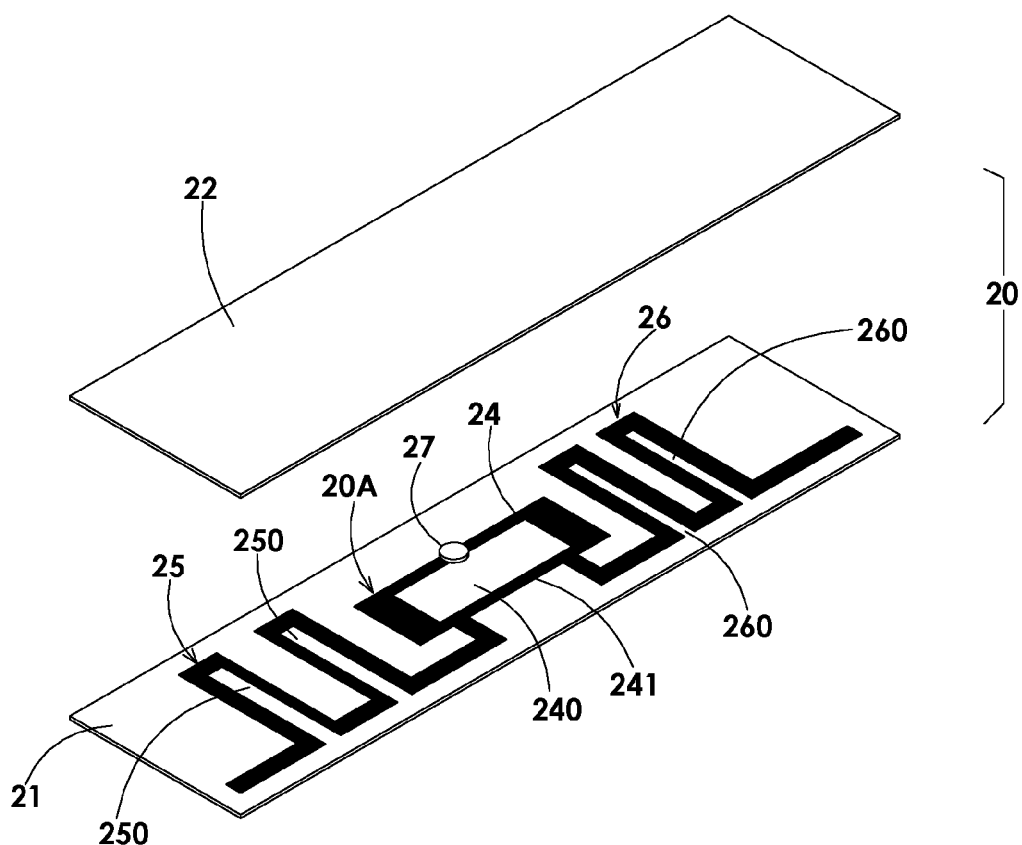
FIG. 3 is an exploded view of the ultra high frequency electronic tag of the present invention.
Figure 4:
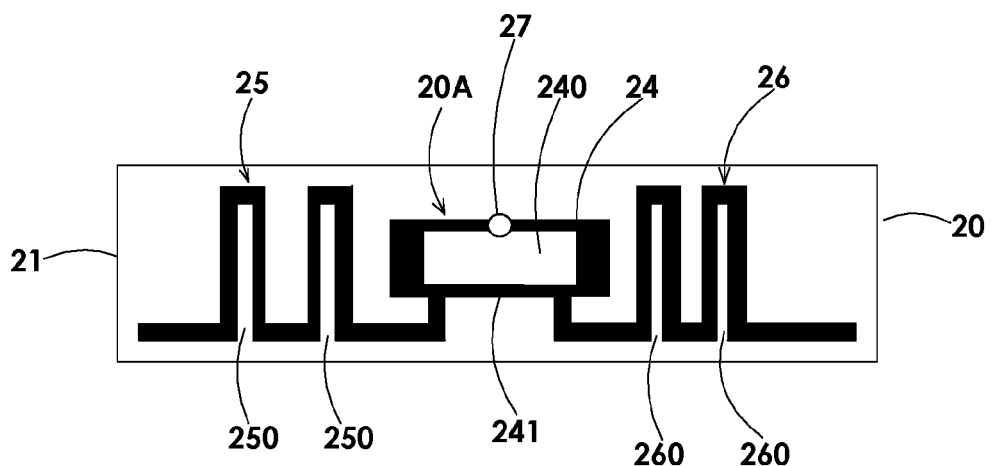
FIG. 4 is a schematic view of the far-field copper film antenna of the ultra high frequency electronic tag of the present invention.

According to the aforesaid embodiment, as shown in FIG. 3, the substrate sheet 21 and the antenna protective film 22 of the ultra high frequency electronic tag 20 are flexible temperature-resistant insulating films made of a polyimide (PI) material. Through the temperature-resistant characteristics of the polyimide material, the ultra high frequency electronic tag 20 in the main tire body 10 is capable of withstanding the operating temperature during the raw tire production process and the vulcanization process without being damaged or deformed.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A long-distance radio frequency electronic identification tire structure, comprising a main tire body with an ultra high frequency electronic tag, an outer surface of the main tire body being formed with a tire tread, each of two sides of the tire tread being formed with a tire shoulder and a tire sidewall; the main tire body having a bead assembly composed of a tire bead bundle and a bead filler and including an airtight layer, a liner layer, a steel belt layer, and a cover layer arranged from inside to outside; the ultra high frequency electronic tag comprising a substrate sheet made of a flexible temperature-resistant insulating material, a far-field copper film antenna formed on a surface of the substrate sheet, and an antenna protective film made of a flexible temperature-resistant insulating material attached to a surface of the far-field copper film antenna; the far-field copper film antenna including a frequency band/bandwidth adjustment portion, a first field effect adjustment portion and a second field effect adjustment portion at two sides of the frequency band/bandwidth adjustment portion respectively; the frequency band/bandwidth adjustment portion having a rectangular perforation formed on a copper film to form a rectangular loop circuit, the rectangular loop circuit being electrically connected with a radio frequency identification chip; the first field effect adjustment portion being a square wave antenna electrically connected with the rectangular loop circuit and matched with the tire bead bundle and the steel belt layer of the main tire body and having a plurality of first field effect adjustment grooves; the second field effect adjustment portion being a square wave antenna electrically connected with the rectangular loop circuit and matched with the tire bead bundle and the steel belt layer of the main tire body and having a plurality of second field effect adjustment grooves each having a width less than that of the first field effect adjustment grooves.

2. The long-distance radio frequency electronic identification tire structure as claimed in claim 1, wherein the ultra high frequency electronic tag is attached to a surface of the liner layer of the main tire body and covered by the tire sidewall at one side of the tire tread.

3. The long-distance radio frequency electronic identification tire structure as claimed in claim 2, wherein the substrate sheet of the ultra high frequency electronic tag is provided with a near-field loop antenna formed by etching a copper foil at one side of the far-field copper film antenna, and two ends of the near-field loop antenna are electrically connected with another radio frequency identification chip to form a high frequency electronic tag.

4. The long-distance radio frequency electronic identification tire structure as claimed in claim 2, wherein a high frequency electronic tag is attached to a side of the ultra high frequency electronic tag, the high frequency electronic tag has a near-field loop antenna matched with the far-field copper film antenna of the ultra high frequency electronic tag, and two ends of the near-field loop antenna are electrically connected with another radio frequency identification chip.

5. The long-distance radio frequency electronic identification tire structure as claimed in claim 1, wherein the frequency band/bandwidth adjustment portion of the far-field copper film antenna of the ultra high frequency electronic tag uses the rectangular perforation to adjust a frequency band and bandwidth for use, the first field effect adjustment portion and the second field effect adjustment portion are dual square wave antennas and asymmetrical according to a reflection field pattern of the tire bead bundle and the steel belt layer relative to an electromagnetic wave signal, the first field effect adjustment portion is formed with two first field effect adjustment grooves, the second field effect adjustment portion is formed with two second field effect adjustment grooves, and the first field effect adjustment grooves each have a width greater than that of the second field effect adjustment grooves.

6. The long-distance radio frequency electronic identification tire structure as claimed in claim 1, wherein the substrate sheet and the antenna protective film of the ultra high frequency electronic tag are flexible temperature-resistant insulating films made of a polyimide (PI) material.

* * * * *